United States Patent
Hoshino

(10) Patent No.: US 11,416,555 B2
(45) Date of Patent: Aug. 16, 2022

(54) DATA STRUCTURING DEVICE, DATA STRUCTURING METHOD, AND PROGRAM STORAGE MEDIUM

(71) Applicant: NEC Corporation, Tokyo (JP)

(72) Inventor: Ayako Hoshino, Tokyo (JP)

(73) Assignee: NEC CORPORATION, Tokyo (JP)

( * ) Notice: Subject to any disclaimer, the term of this patent is extended or adjusted under 35 U.S.C. 154(b) by 184 days.

(21) Appl. No.: 16/490,948

(22) PCT Filed: Mar. 16, 2018

(86) PCT No.: PCT/JP2018/010411
§ 371 (c)(1),
(2) Date: Sep. 4, 2019

(87) PCT Pub. No.: WO2018/173943
PCT Pub. Date: Sep. 27, 2018

(65) Prior Publication Data
US 2020/0019569 A1 Jan. 16, 2020

(30) Foreign Application Priority Data
Mar. 21, 2017 (JP) .............................. JP2017-054520

(51) Int. Cl.
*G10L 15/00* (2013.01)
*G06F 16/9032* (2019.01)
(Continued)

(52) U.S. Cl.
CPC .... *G06F 16/90332* (2019.01); *G06F 16/9027* (2019.01); *G06F 16/9535* (2019.01);
(Continued)

(58) Field of Classification Search
CPC ........... G06F 16/9027; G06F 16/90332; G06F 17/18; G06F 40/20; G06F 40/289;
(Continued)

(56) References Cited

U.S. PATENT DOCUMENTS 8,117,023 B2 * 2/2012 Funakoshi .............. G06F 40/30
704/9
8,510,302 B2 * 8/2013 Sweeney ............... G06F 16/367
707/758

(Continued)

FOREIGN PATENT DOCUMENTS

JP  H08-101203 A  4/1996
JP  H09-198399 A  7/1997

(Continued)

OTHER PUBLICATIONS

C. Lewis and G. Di Fabbrizio, "A clarification algorithm for spoken dialogue systems," Proceedings. (ICASSP '05). IEEE International Conference on Acoustics, Speech, and Signal Processing, 2005., 2005, pp. I/37-I/40 vol. 1. (Year: 2005).*

(Continued)

Primary Examiner — Edgar X Guerra-Erazo
(74) Attorney, Agent, or Firm — Sughrue Mion, PLLC

(57) ABSTRACT

A data structuring device 1 includes an acquisition unit 2 and a modeling unit 3. The acquisition unit 2 acquires branch expression data. Branch expression data is data that includes a branch expression, which is an utterance expression in a conversation for which multiple mutually different replies can be assumed. The conversation data is converted to a graph structure in which the content of the conversation is divided into multiple nodes, and the multiple nodes are connected by means of edges. On the basis of the branch expression data obtained by the acquisition unit 2, the modeling unit 3 carries out a process on the multiple items of conversation data in the graph structure in which nodes that share a common branch expression are combined in one node, thereby modeling the multiple items of conversation data in one tree structure.

11 Claims, 18 Drawing Sheets

(51) Int. Cl.
    *G06F 16/901*    (2019.01)
    *G10L 15/18*     (2013.01)
    *G06F 16/9535*   (2019.01)
    *G06F 40/20*     (2020.01)
    *G10L 15/22*     (2006.01)

(52) U.S. Cl.
    CPC .............. *G06F 40/20* (2020.01); *G10L 15/18* (2013.01); *G10L 2015/223* (2013.01)

(58) Field of Classification Search
    CPC .... G06F 11/3608; G06F 40/284; G06F 40/00; G06F 40/10; G06F 40/205; G06F 40/216; G06F 40/211; G06F 40/237; G06F 40/268; G06F 40/274; G06F 40/30; G10L 15/18; G10L 2015/223; G10L 15/28
    See application file for complete search history.

(56) References Cited

U.S. PATENT DOCUMENTS

| | | | |
|---|---|---|---|
| 9,904,729 B2* | 2/2018 | Sweeney | G06F 16/35 |
| 2006/0015317 A1* | 1/2006 | Nakagawa | G06F 40/268 |
| | | | 704/1 |
| 2008/0140389 A1* | 6/2008 | Funakoshi | G06F 40/30 |
| | | | 704/9 |
| 2009/0222507 A1 | 9/2009 | Koseki et al. | |
| 2014/0019443 A1* | 1/2014 | Golshan | G06F 16/9535 |
| | | | 707/723 |
| 2014/0250195 A1* | 9/2014 | Capper | G06N 20/00 |
| | | | 709/206 |
| 2014/0279906 A1* | 9/2014 | Peintner | G06Q 50/01 |
| | | | 707/639 |
| 2015/0127631 A1 | 5/2015 | Anand et al. | |
| 2015/0222730 A1* | 8/2015 | Gower | H04L 67/42 |
| | | | 709/203 |
| 2017/0118336 A1* | 4/2017 | Tapuhi | G06F 16/3329 |
| 2019/0212879 A1* | 7/2019 | Anand | G06Q 50/20 |

FOREIGN PATENT DOCUMENTS

| | | |
|---|---|---|
| JP | 2009205552 A | 9/2009 |
| JP | 2013105436 A | 5/2013 |

OTHER PUBLICATIONS

Kyungdeok Kim, "Tree-based conversation interface using a folding policy on conversation messages," International Conference on Next Generation Web Services Practices (NWeSP'05), 2005, pp. 6 pp. (Year: 2005).*

Y. Ong and W. Kurth, "A graph model and grammar for multi-scale modelling using XL," 2012 IEEE International Conference on Bioinformatics and Biomedicine Workshops, 2012, pp. 1-8. (Year: 2012).*

G. Promhouse, "Tree compacting transformations," [Proceedings] DCC '93: Data Compression Conference, 1993, pp. 320-329. (Year: 1993).*

X. Zhu, C. Cherry and G. Penn, "A Graph-Partitioning Framework for Aligning Hierarchical Topic Structures to Presentations," in IEEE Transactions on Audio, Speech, and Language Processing, vol. 21, No. 5, pp. 1102-1112, May 2013. (Year: 2013).*

Annie Louis et al., "Conversation Trees: A Grammar Model for Topic Structure in Forums", Proceedings of the 2015 Conference on Empirical Methods in Natural Language Processing, 2015, pp. 1543-1553 (11 pages total).

Srinivas Bangalore et al., "Learning the Structure of Task-Driven Human-Human Dialogs", IEEE Transactions on Audio, Speech, and Language Processing, vol. 16, No. 7, 2008, pp. 1249-1259 (11 pages total).

Written Opinion of the International Searching Authority dated Jun. 12, 2018, in International Application No. PCT/JP2018/010411.

International Search Report dated Jun. 12, 2018, in International Application No. PCT/JP2018/010411.

Japanese Office Communication for JP Application No. 2019-507626 dated Mar. 29, 2022 with English Translation.

* cited by examiner

Fig. 3

| BRANCH EXPRESSION |
|---|
| (What would you like to)?order.*(?\|please.)$ |
| Is (it\|this) for a (present\|gift)?$ |

Fig. 4

| SPEAKER | UTTERANCE CONTENTS |
|---|---|
| OP | IS THIS YOUR FIRST TIME VISITING OUR WEB SITE? |
| U | YES, IT IS. |
| OP | THEN, LET US START FROM YOUR USER REGISTRATION.<br>(OMISSION)<br>WHAT WOULD YOU LIKE TO ORDER? |
| U | ONE PRODUCT A |
| OP | CERTAINLY, ONE PRODUCT A. |
| U | THANK YOU. |
| | THE REST IS OMITTED. |

Fig. 5

| SPEAKER | UTTERANCE CONTENTS |
|---|---|
| OP | IS THIS YOUR FIRST TIME VISITING OUR WEB SITE? |
| U | NO, IT'S NOT. |
| OP | MAY I HAVE YOUR CUSTORMER ID, PLEASE? |
| U | XYZ-001 |
| OP | WHAT WOULD YOU LIKE TO ORDER, PLEASE. |
| U | ONE PRODUCT B. |
| OP | CIRTAINLY, ONE PRODUCT B. IS THIS FOR A GIFT? |
| U | YES, IT IS FOR A GIFT. I WOULD LIKE TO SEND IT TO ⋯. |
| THE REST IS OMITTED. ||

Fig. 6

| SPEAKER | UTTERANCE CONTENTS |
|---|---|
| OP | IS THIS YOUR FIRST TIME VISITING OUR WEB SITE? |
| U | NO, IT'S NOT. |
| OP | MAY I HAVE YOUR COSTOMER ID, PLEASE? |
| U | XYZ-002 |
| OP | WHAT WOULD YOU LIKE TO ORDER, PLEASE. |
| U | ONE PRODUCT C. |
| OP | CIRTAINLY, ONE PRODUCT C. IT THIS FOR A GIFT? |
| U | NO, IT'S FOR HOME USE. PLEASE SEND IT TO MY ADDRESS. |
| | THE REST IS OMITTED. |

Fig. 12

| ITEM ID | UTTERANCE EXAMPLE DATA |
|---|---|
| 1 | IS THIS YOUR FIRST TIME VISITING OUR WEB SITE? |
| 1-1 | THEN, LET US START FROM YOUR USER REGISTRATION. |
| 1-2 | MAY I HAVE YOUR CUSTOMER ID, PLEASE? |
| 2-1 | WHAT WOULD YOU LIKE TO ORDER? |
| 2-2 | (CASE OF PRODUCT FOR GIFT) IS THIS FOR A GIFT? |
| 4 | CONFIRM ADDRESS |

Fig. 15

| SPEAKER | UTTRANCE CONTENTS |
|---|---|
| OP | IS THIS YOUR FIRST TIME VISITING OUR WEB SITE? |
| U | NO, IT'S NOT. |
| OP | MAY I HAVE YOUR COSTUMER ID, PLEASE? |
| U | XYZ-002 |
| OP | WHAT WOULD YOU LIKE TO ORDER, PLEASE. |
| U | ONE PRODUCT A |
| OP | CIRTAINLY, ONE PRODUCT A. |
| U | THANK YOU. |

Fig. 16

| ITEM ID | UTTERANCE DATA | FREQUENCY |
|---|---|---|
| 1 | IS THIS YOUR FIRST TIME VISITING OUR WEB SITE? | 3 |
| 4 | ONE PRODUCT A. | 2 |

DATA STRUCTURING DEVICE, DATA STRUCTURING METHOD, AND PROGRAM STORAGE MEDIUM

This application is a National Stage Entry of PCT/JP2018/010411 filed on Mar. 16, 2018, which claims priority from Japanese Patent Application 2017-054520 filed on Mar. 21, 2017, the contents of all of which are incorporated herein by reference, in their entirety.

TECHNICAL FIELD

The present invention relates to a technique for modeling conversation data into a tree structure.

BACKGROUND ART

One example of a method of structuring conversation data is described in PTL 1. Specifically, PTL 1 relates to a system for supporting a personal service, and PTL 1 discloses a method of modeling, into a tree structure, a dialog history between inquiries from a user and replies to the inquires, which are made by an agent. The tree structure is one type of graph structures, and is referred to a model expressed by a plurality of nodes (nodal points) and edges (branches) connecting the nodes with each other. A relationship between the nodes in the tree structure is expressed by use of terminology that compares the tree structure to a pedigree diagram. In the tree structure, two nodes connected by an edge is in a parent-child relationship. One parent node is able to have a plurality of child nodes, whereas one child node is not able to have a plurality of parent nodes. A conversation modeled in a tree structure is referred to as a dialog tree. Further, the most significant node being reached by following parents of all the nodes is also referred to as a root, and an end node that does not have a child node is also referred to as a leaf.

In the method disclosed in PTL 1, a dialog is modeled into a list structure in which an utterance unit is regarded as a node, and data in the list structure are stored in a database. Further, a plurality of list structures are integrated, based on utterance contents of the nodes, and thereby the dialog is modeled into a systematic dialog model. With this, it is described that, when a user or an agent searches for a reply to an inquiry from a database accumulating dialogs, a redundant search result is prevented, and hence a user and an agent can effectively use the database of dialog histories.

Further, another example of a method of structuring conversation data is disclosed in NPL 1. In the method in NPL 1, dialog history data are analyzed, and various labels based on the analysis are provided to the dialog history data. The various labels include, for example, a predicate argument annotation, a named entity annotation, a dialog act tag, a task subtask label, and the like. A conversation is then modeled by parsing an utterance string by use of the labels, and the like.

Further, another example of a method of structuring conversation data is also disclosed in NPL 2. In the method in NPL 2, a structure analysis is performed on a text being an analysis target by use of grammar such as probabilistic context-free grammars (PCFG), and probabilistic linear context-free rewriting systems (PLCFRS). Further, the text being an analysis target is modeled, based on the structure analysis result.

CITATION LIST

Patent Literature

[PTL 1] Japanese Unexamined Patent Application Publication No. 2009-205552

Non Patent Literature

[NPL 1] S. Bangalore et al. (AT&T), "Learning the Structure of Task-Driven Human-Human Dialogs", IEEE Transactions on Audio, Speech, and Language Processing, Vol. 16, No. 7, PP. 1249-1259, 2008

[NPL 2] A. Louis and S. B. Cohen (U. Edinburgh), "Conversation Trees: A Grammar Model for Topic Structure in Forums", Proceedings of the 2015 Conference on Empirical Methods in Natural Language Processing, PP. 1543-1553, 2015

SUMMARY OF INVENTION

Technical Problem

As described above, various methods of modeling conversation data are proposed. However, in the method described in PTL 1 and the like, there is a problem that a plurality of conversations cannot be modeled into one tree structure (conversation tree) without requiring human work. Modeling the plurality of conversations into one tree structure involves integrating and modeling the plurality of conversations, and integrating, into one tree structure, the plurality of reply conversations associated with common conversation contents in the plurality of conversations.

Specifically, in PTL 1, it is described that two pieces of conversation data are integrated into one tree structure. However, in the method described in PTL 1, in order to integrate two pieces of conversation data into one tree structure, a person is required to select a conversation being an integration target or specify a joint part. In other words, in the method in PTL 1, the plurality of conversations cannot be integrated into one tree structure without specification given by a person. Further, in NPL 1 and NPL 2, a method of modeling one piece of conversation data into one tree structure is described, but a method of integrating a plurality of pieces of conversation data into one tree structure is not described. Further, in NPL 1 and NPL 2, a tree structure acquired by modeling one piece of conversation data is described. However, in the tree structure in NPL 1 and NPL 2, a natural flow in a conversation is not established when following from a root to a leaf. Thus, it is not easy to search for a reply to a certain utterance in consideration of a conversation flow.

The present invention has been made in order to solve the above-mentioned problems. Specifically, a main object of the present invention is to provide a technique for being capable of modeling a plurality of pieces of conversation data into one tree structure without requiring human work, and for acquiring a tree structure that an utterance example of reply to a specified utterance can be acquired easily in consideration of a conversation flow.

Solution to Problem

In order to achieve the above-mentioned object, a data structuring device according to an example aspect of the invention includes an acquisition unit which acquires branch expression data expressing a branch expression being an utterance expression for which a plurality of replies different from one another are assumed in a conversation, and a modeling unit which, in a plurality of pieces of conversation data being converted into a graph structure in which conversation contents are divided into a plurality of nodes and the plurality of nodes are connected by edges, models the plurality of pieces of conversation data into one tree structure by performing processing of integrating the nodes, which share the branch expression in common, into one node, based on the acquired branch expression data.

A data structuring method according to an example aspect of the invention includes acquiring branch expression data expressing a branch expression being an utterance expression for which a plurality of replies different from one another are assumed in a conversation, and modeling, in a plurality of pieces of conversation data being converted into a graph structure in which conversation contents are divided into a plurality of nodes and the plurality of nodes are connected by edges, the plurality of pieces of conversation data into one tree structure by performing processing of integrating the nodes, which share the branch expression in common, into one node, based on the acquired branch expression data.

A program storage medium according to an example aspect of the invention stores a computer program causing a computer to execute processing of acquiring branch expression data expressing a branch expression being an utterance expression for which a plurality of replies different from one another are assumed in a conversation, and processing of, in a plurality of pieces of conversation data being converted into a graph structure in which conversation contents are divided into a plurality of nodes and the plurality of nodes are connected by edges, modeling the plurality of pieces of conversation data into one tree structure by performing processing of integrating the nodes, which share the branch expression in common, into one node, based on the acquired branch expression data.

Advantageous Effects of Invention

According to the present invention, a plurality of pieces of conversation data can be modeled into one tree structure without requiring human work, and a tree structure in which an utterance example of reply to a specified utterance can be acquired easily in consideration of a conversation flow can be acquired.

BRIEF DESCRIPTION OF DRAWINGS

FIG. 3 is a diagram illustrating a specific example of branch expression data used by the data structuring device according to the second example embodiment.

FIG. 4 is a diagram illustrating one example of conversation data used for describing a specific example in the second example embodiment, FIG. 5 is a diagram for illustrating another example of conversation data used for describing a specific example in the second example embodiment.

FIG. 6 is a diagram for illustrating further another example of conversation data used for describing a specific example in the second example embodiment.

FIG. 12 is a diagram illustrating one example of manual data used by the data structuring device according to the third example embodiment for processing.

FIG. 15 is a diagram illustrating one example of conversation data used for describing a specific example in the fourth example embodiment.

FIG. 16 is a diagram illustrating a specific example of branch expression candidates extracted by an extraction unit from conversation data in the fourth example embodiment.

EXAMPLE EMBODIMENT

With reference to the drawings, example embodiments of the present invention are described below.

First Example Embodiment

Figure 1:
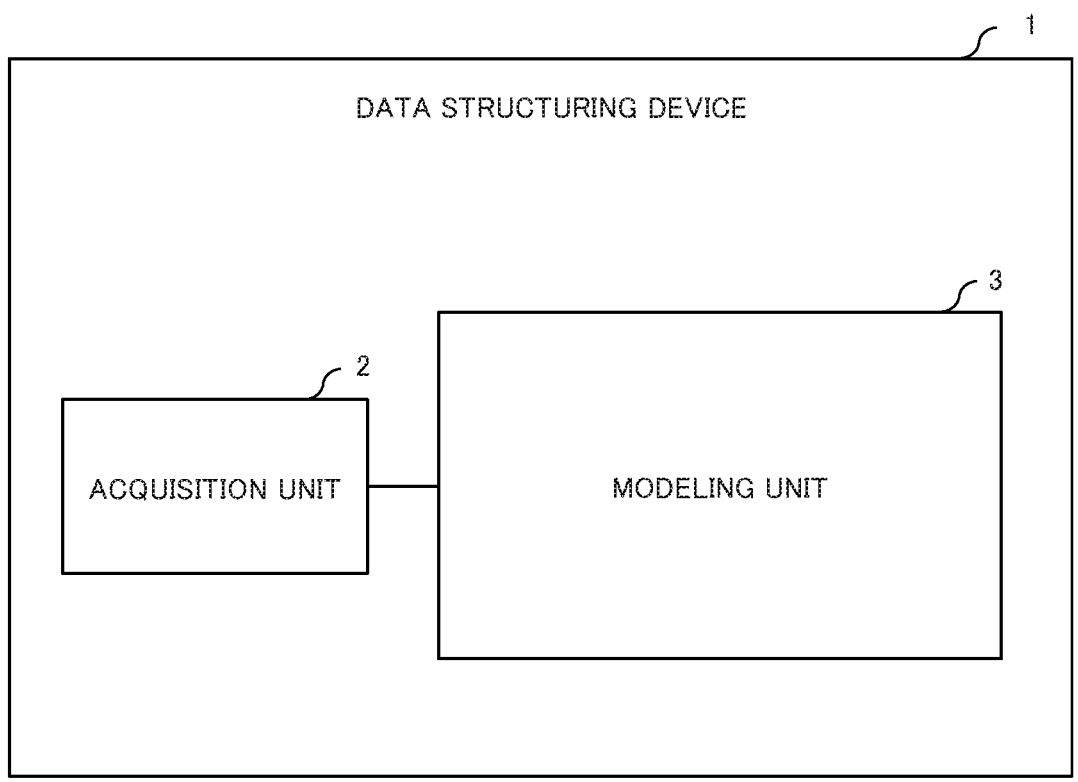
FIG. 1 is a block diagram illustrating in a simplified manner a configuration of a data structuring device according to a first example embodiment of the present invention.

FIG. 1 is a block diagram illustrating in a simplified manner a configuration of a data structuring device according to a first example embodiment of the present invention. A data structuring device 1 according to the first example embodiment includes an acquisition unit 2 and a modeling unit 3. The acquisition unit 2 has a function of acquiring branch expression data. The branch expression data refer to data containing a branch expression being an utterance expression for which a plurality of replies different from each other are assumed in a conversation.

In the first example embodiment, conversation data are converted in a graph structure in which conversation contents are divided into a plurality of nodes and the plurality of nodes are connected by edges. The modeling unit 3 has a function of modeling a plurality of pieces of conversation data into one tree structure by subjecting the plurality of pieces of conversation data having a graph structure to perform processing of integrating nodes, which share a common branch expression, in one node, based on the branch expression data being acquired by the acquisition unit 2.

The data structuring device 1 according to the first example embodiment is capable of integrating the plurality of pieces of conversation data into one tree structure without requiring human work by focusing on the branch expression. Further, the data structuring device 1 according to the first example embodiment integrates the plurality of pieces of conversation data into one tree structure by focusing the branch expression, and hence, for example, an analysis on a reply to an inquiry or a request in the conversation is facilitated by use of the conversation tree structure generated by the data structuring device 1. Furthermore, the data structuring device 1 integrates the plurality of pieces of conversation data into one tree structure by focusing the branch expression, and hence the plurality of pieces of conversation data can be integrated into one tree structure, while maintaining a conversation flow (i.e., in a state in which the conversation can be reproduced when following from a root to a leaf). In other words, the data structuring device 1 according to the first example embodiment is capable of modeling the plurality of pieces of conversation data into one tree structure without requiring human work, and a tree structure that an utterance example of reply to a specified utterance can be acquired easily in consideration of a conversation flow can be acquired.

A model in a conversation tree structure generated by the data structuring device 1 according to the first example embodiment is, for example, used by a support system for an operator at a contact center. With this, for example, a reply to an inquiry or a request can be searched easily.

Second Example Embodiment

Figure 2:
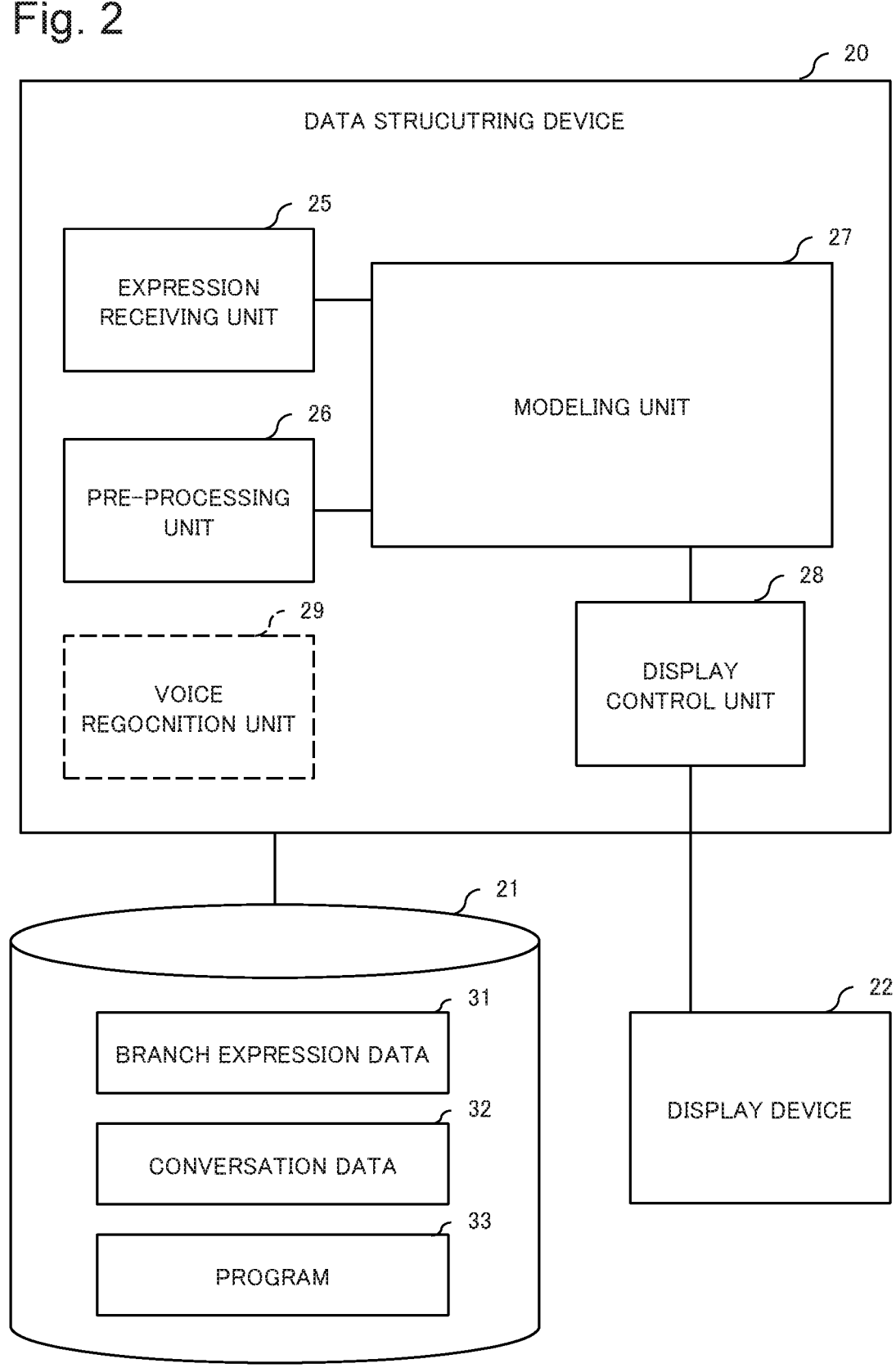
FIG. 2 is a block diagram illustrating in a simplified manner a configuration of a data structuring device according to a second example embodiment of the present invention.

FIG. 2 is a block diagram illustrating in a simplified manner a configuration of a data structuring device according to a second example embodiment of the present invention. A data structuring device 20 according to the second example embodiment is a device configured to model conversation data in a tree structure, and is achieved by, for example, a central processing unit (CPU). The data structuring device 20 focuses on a branch expression in a conversation, and has a function of modeling a plurality of pieces of conversation data into one tree structure by use of the branch expression.

The branch expression referred herein is an expression included in an utterance being a branch point at which a conversation flow branches in a plurality of conversations. As a specific example of the branch expression, for example, a question expression is given. Specifically, for a question "Is this your first time at this shop?", a plurality of replies (answers), which are "Yes, it is." and "No, it's not.", are available, and the conversation flow is considered to branch. Thus, an utterance expression for the question (inquiry) as described above is a branch expression. Further, for a request "Let me take your order.", a plurality of replies (answers), which are "I will order the product A.", "I will order the product B.", and "I will order the product C.", are conceivable. For this reason, such request expression is also considered as a branch expression. Thus, various expressions can be considered as the branch expression.

The data structuring device 20 is connected to a storage device 21 and a display device 22. The display device 22 includes a screen, and has a function of displaying various types of information on the screen.

The storage device 21 stores a computer program (program) 33 for achieving the function of the data structuring device 20. Further, the storage device 21 stores branch expression data 31 used by the data structuring device 20 for processing. The branch expression data 31 are data for expressing the branch expression. FIG. 3 represents one specific example of the branch expression data. The branch expression data 31 in FIG. 3 are in a data form of character strings containing regular expressions. However, the branch expression data 31 are not limited to the data on character strings containing regular expressions, but may be, for example, data on character strings containing an original forms of a part of speech and a morpheme that are acquired by a morphological analysis result.

Further, the storage device 21 stores conversation data 32. The conversation data 32 are, for example, text data. Each of FIG. 4 to FIG. 6 represents specific examples of the conversation data 32. The specific examples of the conversations given in each of FIG. 4 to FIG. 6 are conversations between an operator at an order receiving center (denoted as OP in FIG. 4 to FIG. 6) and a user (denoted as U in FIG. 4 to FIG. 6).

The data structuring device 20 is able to have a following function by causing the CPU to read the program 33 in the storage device 21 and to execute the program 33. Specifically, the data structuring device 20 includes, as function units, an expression receiving unit 25 being an acquisition unit, a pre-processing unit 26, a modeling unit 27, and a display control unit 28.

The expression receiving unit 25 has a function of reading the branch expression data 31 from the storage device 21 and supplying the read branch expression data 31 to the modeling unit 27.

The pre-processing unit 26 has a function of reading the conversation data 32 being a processing target from the storage device 21 and subjecting the read conversation data to a pre-processing. The pre-processing is a predetermined natural language processing such as a text division, a morphological analysis (including word separation with spaces and labeling of parts of speech), named-entity extraction, and an anaphoric analysis.

The modeling unit 27 has a function of modeling the plurality of pieces of conversation data in a tree structure, based on the branch expression data 31 received from the expression receiving unit 25 and the conversation data 32 processed by the pre-processing unit 26. The tree structure generated by the modeling unit 27 has a structure in which a start of the conversation is regarded as a root and an end of the conversation is regarded as a leaf. Further, in this case, a plurality of conversations integrated into one tree structure are assumed to take place as conversations between, for example, an operator at an order receiving center that receives an order of a product and a user, or in a similar situation.

Figure 7:
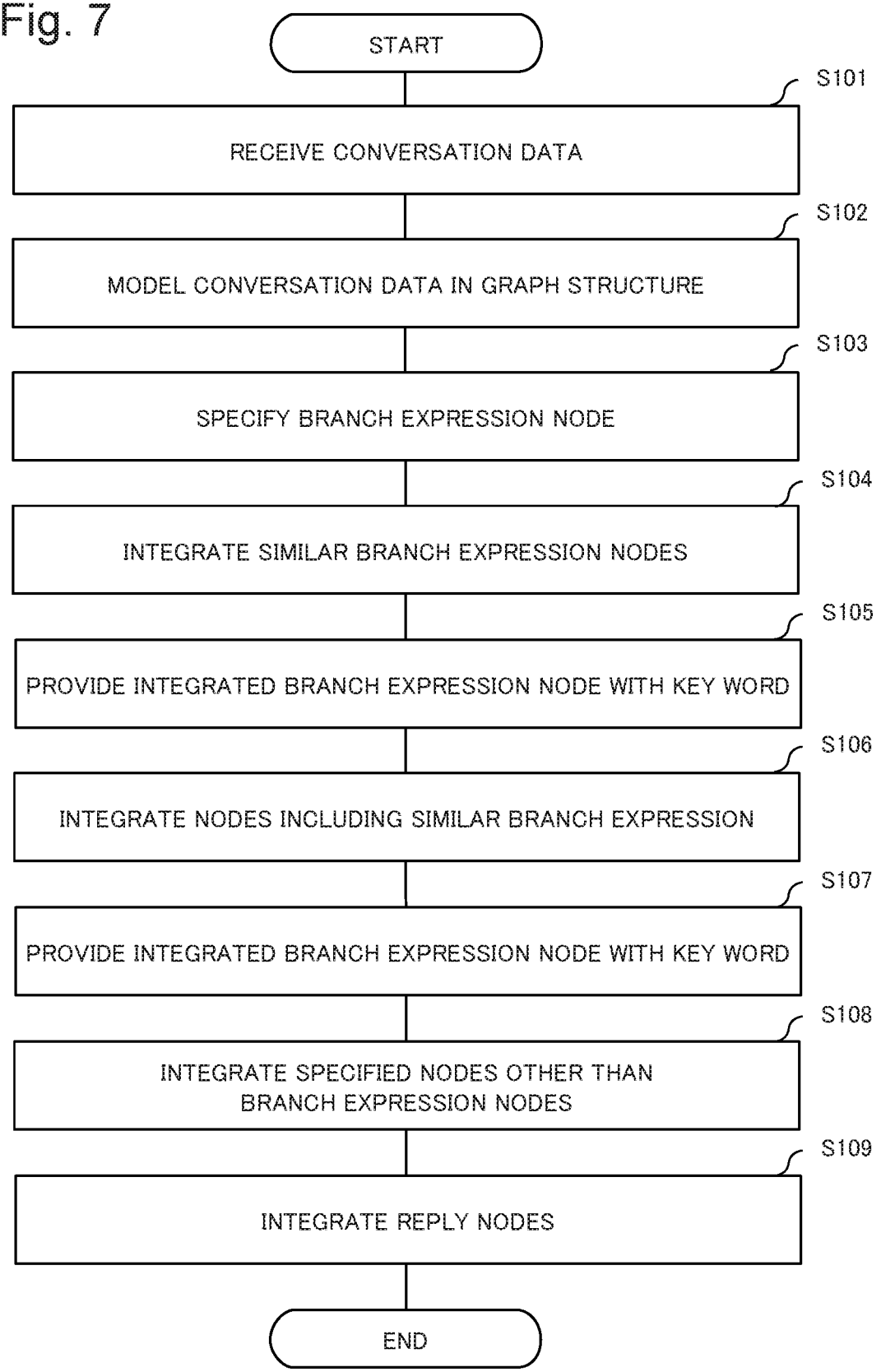
FIG. 7 is a flowchart illustrating an operation example of a modeling unit in the second example embodiment.
Figure 8:
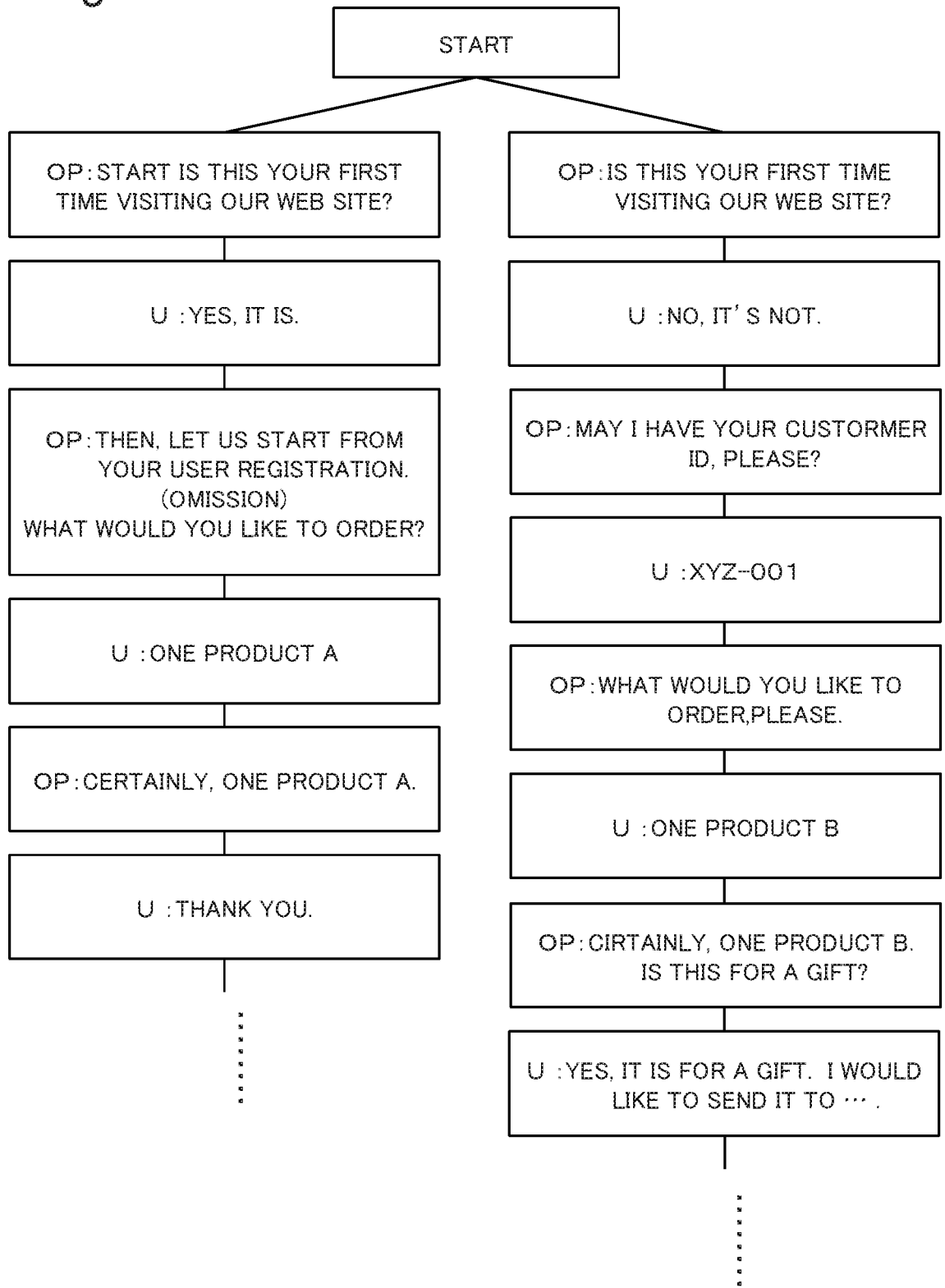
FIG. 8 is a diagram illustrating a state in which a plurality of pieces of conversation data are converted in a graph structure.

FIG. 7 is a diagram illustrating one example of a flow of the processing performed by the modeling unit 27. For example, it is assumed that the conversation data 32 represented in FIG. 4 and the conversation data 32 represented in FIG. 5 are processed by the pre-processing unit 26, and the conversation data 32 provided with information generated by the processing is supplied to the modeling unit 27. When the modeling unit 27 receives the plurality of pieces of conversation data 32 being a processing target through the pre-processing unit 26 (S101), the modeling unit 27 regards one utterance as one node and regards sequential utterances as a parent-child relationship. Then, the modeling unit 27 regards connects the nodes in the parent-child relationship with each other by edges. In this manner, the modeling unit 27 models the conversation data 32 in a graph structure (S102). One example of the graph structure generated by the processing is represented in FIG. 8. Note that, in FIG. 8, OP refers to an operator, and U refers to a user.

After that, the modeling unit 27 specifies a node (hereinafter, also referred to as a branch expression node) including the branch expression, based on the branch expression data 31 received from the expression receiving unit 25 (S103). Subsequently, the modeling unit 27 focuses on one of the plurality of pieces of conversation data 32 being a processing target, and follows the nodes sequentially from the start of the conversation (root) to the end of the conversation (leaf). In this case, the modeling unit 27 confirms whether or not the branch expression node including a similar branch expression in common with that of the first branch expression node is present in other pieces of conversation data 32. With this, when the branch expression node including a similar branch expression is present in the other pieces of conversation data 32, the modeling unit 27 integrates those branch expression nodes including the similar branch expression in common in one node (S104). Further, among morphemes in the utterance, which are included in the integrated branch expression nodes, the modeling unit 27 extracts a morpheme having a high appearance frequency as a key word from the conversation data 32 and provides the branch expression node with the key word (S105).

Specifically, for example, the branch expression node corresponding to the branch expression data represented in FIG. 3, which is "(What would you like to)? order.*(?|, please.)$", is present in common in the plurality of pieces of conversation data 32 in the example in FIG. 8, and hence those branch expression nodes are integrated. Further, the integrated branch expression node (hereinafter, also referred to as a coupling node for branch expression) is provided with "order" extracted as a key word from the conversation data 32, for example. Note that, the number of key words provided to one coupling node is not limited to one, and a plurality of key words may be provided, for example. Further, a value of a term frequency-inverse document frequency (TF-IDF) may be calculated, and a key word may be extracted from the conversion data 32, based on the calculated value.

After that, the modeling unit 27 continues following the nodes in the conversation data 32 being focused on toward the leaf. Then, the modeling unit 27 executes the following processing when the branch expression node is present. Specifically, among other nodes in the conversation data 32, which have the coupling node for the branch expression in Step S104 as a common parent node, the modeling unit 27 confirms whether or not the branch expression node including a similar branch expression in common is present. With this, when the branch expression node including a similar branch expression is present in the other pieces of conversation data 32, the modeling unit 27 integrates the branch expression nodes including a similar branch expression in common in one node (S106). Further, the modeling unit 27 provides the coupling node for the branch expression with a key word in a similar manner described above (S107). The modeling unit 27 further follows the nodes in the conversation data 32 being focused on toward the leaf and repeats the processing in Steps S106 and S107 as described above when the branch expression node is present. Further, after reaching the leaf of the conversation data 32 being focused on, the modeling unit 27 changes the conversation data 32 being focused on to another unprocessed piece of conversation data 32 and repeats the processing in Steps S104 to S107 in a similar manner described above.

Then, after all the plurality of pieces of conversation data 32 being a processing target are subjected to the processing in Steps S104 to S107, the modeling unit 27 integrates specified nodes from the nodes other than the coupling nodes for the branch expression (S108). Herein, the modeling unit 27 integrates, in one node, nodes between the coupling node for the branch expression being a first node when following the nodes from the start of the conversation (root) to the end of the conversation (leaf), and the root. Further, the modeling unit 27 integrates, in one node, nodes between the coupling nodes for the branch expressions in a parent-child relationship. Further, the modeling unit 27 provides the nodes integrated as descried above with key words.

Figure 9:
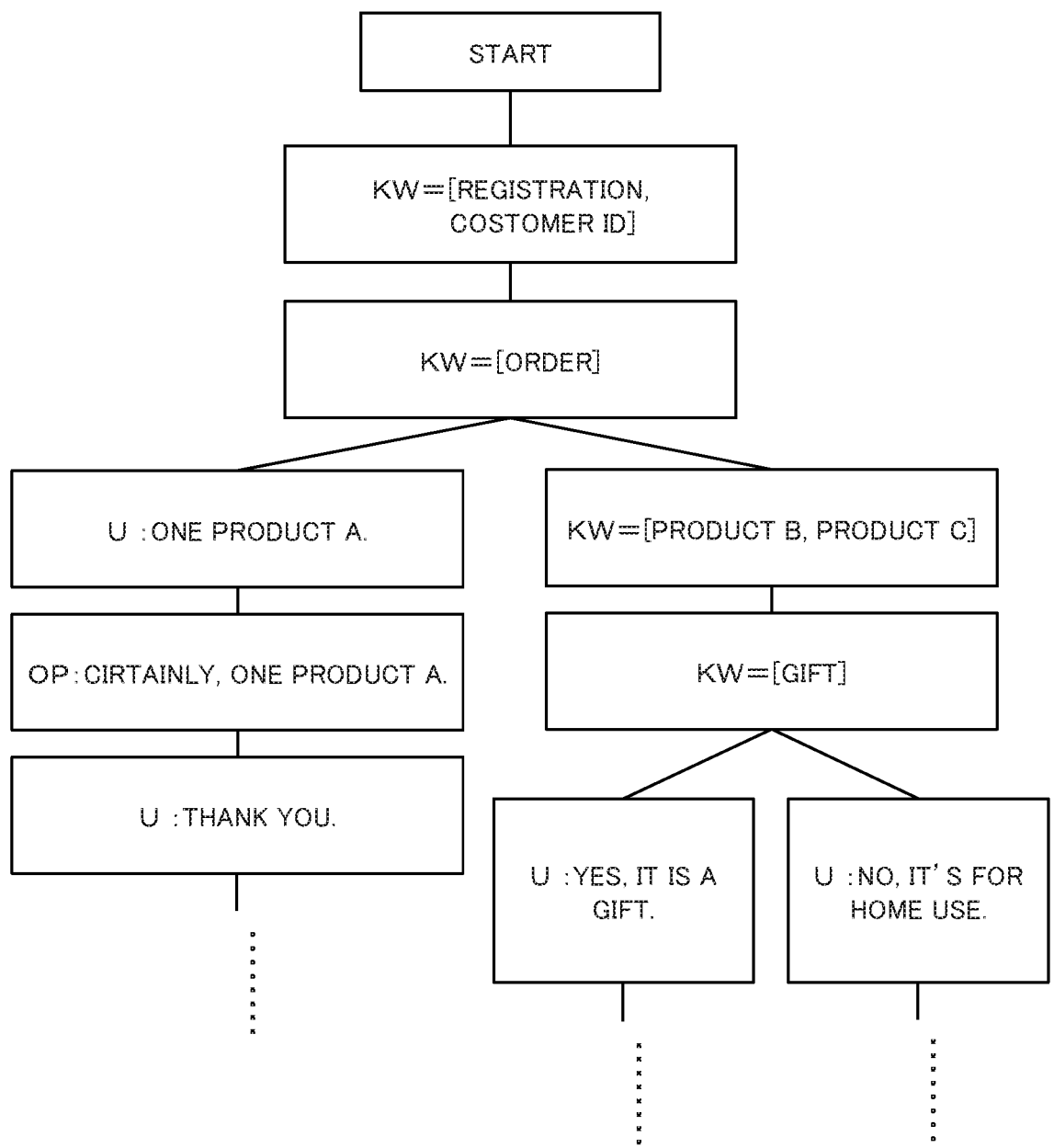
FIG. 9 is a diagram illustrating an operation example in which the modeling unit in the second example embodiment integrates a plurality of pieces of conversation data by use of branch expression.

Specifically, for example, when three pieces of conversation data 32 in FIG. 4 to FIG. 6 are modeled into one tree structure, it is assumed that the branch expression node corresponding to the branch expression data represented in FIG. 3, which is "(What would you like to)? order.*(?|, please.)$", are integrated as the coupling node for the branch expression. Further, it is assumed that the coupling node for the branch expression is provided with "order" as a key word. In this case, all the nodes from the leaf to the coupling node for the branch expression in the three pieces of conversation data 32 in FIG. 4 to FIG. 6 are integrated in one node. Further, the integrated node is provided with, for example, "registration" and "customer ID" as key words. Furthermore, in this case, a node which asks a question whether or not an ordered product is purchased as a gift, in the conversation data in FIG. 5 and the conversation data in FIG. 6, is also specified as branch expression node having a common branch expression, and is integrated in one node. Further, the integrated node is provided with "gift" as a key word. Further, a plurality of nodes in a parent-child relationship between the coupling node for the branch expression relating to "order" and the coupling node for the branch expression relating to "gift" are integrated in one, and the integrated nodes are provided with "product B" and "product C" as key words. FIG. 9 represents a specific example acquired after subjecting the three pieces of conversation data 32 in FIG. 4 to FIG. 6 to the processing of integrating the branch expression nodes, the processing of integrating the specified nodes other than the branch expression nodes, and the processing of providing key words to the integrated nodes as described above. Note that, KW in FIG. 9 refers to a key word.

Figure 10:
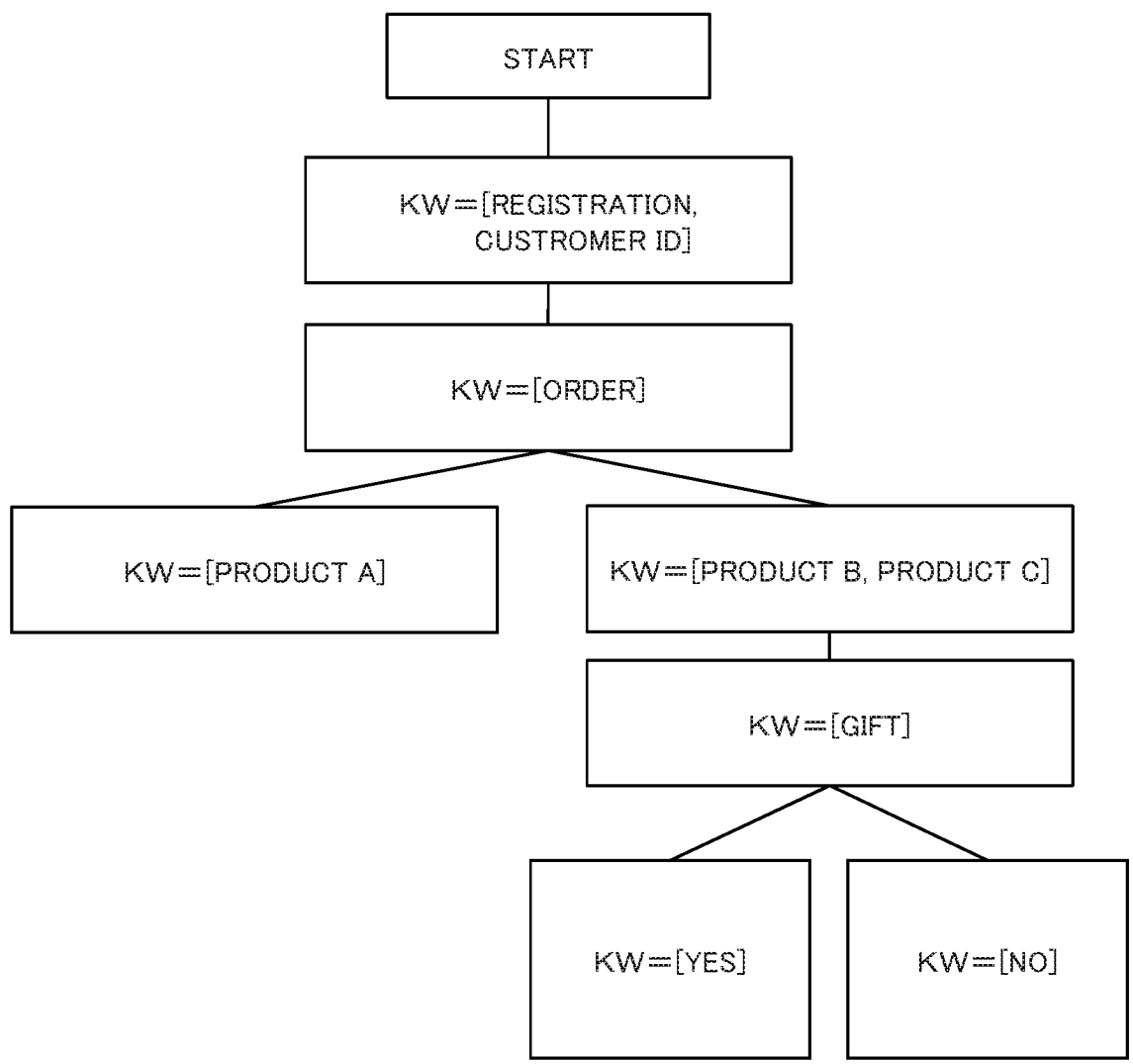
FIG. 10 is a diagram illustrating a specific model example in which the modeling unit in the second example embodiment integrates a plurality of pieces of conversation data into one tree structure.

After that, the modeling unit 27 integrates, as a reply node, the nodes in a parent-child relationship from the last coupling data for the branch expression to the leaf in each piece of conversation data 32, and provides the reply node with a key word representing a reply content (S109). Specifically, for example, when the branch expression node is not present from a node of the utterance "One product A" in FIG. 9 to the leaf (not illustrated), nodes from the node of the utterance "One product A" to the leaf in a parent-child relationship are integrated as the reply node. Further, as illustrated in FIG. 10, the reply node is provided with "product A" extracted from the conversation data as a key word. Further, when the branch expression node is not present from a node of the utterance "Yes, it's a gift." to the leaf, nodes from the node of the utterance "Yes, it's a gift."

to the leaf in a parent-child relationship are integrated as the reply node. Further, as illustrated in FIG. 10, the reply node is provided with "yes" as a key word. Further, when the branch expression node is not present from a node of the utterance "No, it is for home use." to the leaf, nodes from the node of the utterance "No, it is for home use." to the leaf in a parent-child relationship are integrated as the reply node. Further, as illustrated in FIG. 10, the reply node is provided with "no" as a key word. Note that, the reply node may be associated with regular expression data indicating a utterance content (reply content) of the node as a key word.

The modeling unit 27 has a function of modeling the plurality of pieces of conversation data 32 into one tree structure by focusing on the branch expressions and integrating the nodes as described above.

The display control unit 28 has a function of controlling display of the screen of the display device 22, and displays the tree structure generated by the modeling unit 27, the conversation data 32 being an original of the tree structure, and the like, on the screen of the display device 22, in accordance with a request from an operator of the data structuring device 20, for example.

The data structuring device 20 according to the second example embodiment is capable of integrating nodes having similar contents by integrating the nodes based on branch expressions, even with orthographical variants or variations in expression due to the plurality of conversations. Thus, the data structuring device 20 is capable of modeling the plurality of pieces of conversation data 32 into one tree structure. Further, the data structuring device 20 is capable of integrating, into one tree structure, a plurality of replies (reply utterances) to an inquiry utterance, which is made after a similar conversation content in the plurality of conversations, by integrating the nodes based on the branch expressions, for example. Further, the data structuring device 20 integrates the plurality of pieces of conversation data into one tree structure by focusing the branch expression. Hence, similarly to the first example embodiment, the data structuring device 20 is capable of integrating the plurality of pieces of conversation data into one tree structure, while maintaining a conversation flow (i.e., in a state in which the conversation can be reproduced when following from the root to the leaf) In other words, the data structuring device 20 according to the second example embodiment is capable of modeling the plurality of pieces of conversation data into one tree structure without requiring human work, and a tree structure that an utterance example of reply to a specified utterance can be acquired easily in consideration of the conversation flow can be acquired.

Note that, the data structuring device 20 may include a voice recognition unit 29 as illustrated with the broken line in FIG. 2. The voice recognition unit 29 has a function of converting voice data taken in by, for example, a microphone (not illustrated) into text data and storing the text data as the conversation data 32 in the storage device 21.

Figure 18:
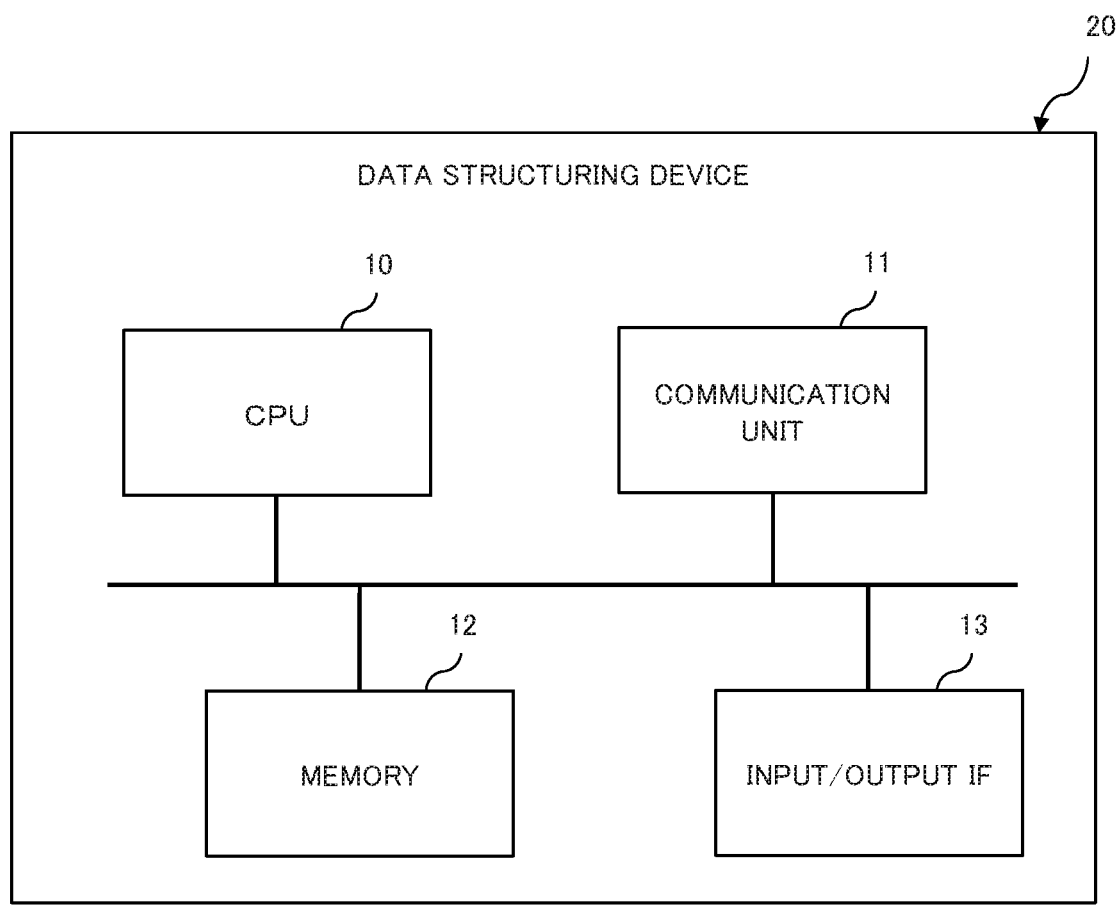
FIG. 18 is a diagram illustrating one example of a hardware configuration of a data structuring device according to each example embodiment of the present invention.

Note that, FIG. 18 is a block diagram illustrating one example of a hardware configuration of the data structuring device 20 in a simplified manner. The data structuring device 20 includes, for example, a central processing unit (CPU) 10, a communication unit 11, a memory 12, and an input/output interface (IF) 13. For example, the communication unit 11 is connected to an external device via an information communication network (not illustrated), and has a function of establishing communication with the device. The input/output IF 13 is connected to, for example, a display device, an input device such as a keyboard with which a operator (user) of the device inputs information, and the like, and has a function of establishing communication for the information (signal) with such device. The memory 12 is a storage device for storing data and a computer program (program). Various types of storage devices are present, and a plurality of kinds of storage devices are mounted on one device in some cases. Herein, one memory is collectively illustrated. The CPU 10 is an arithmetic circuit, and has a function of achieving the processing of the data structuring device 20 as described above, by reading the program stored in the memory 12 and executing the program.

Third Example Embodiment

A third example embodiment of the present invention is described below. Note that, in the description of the third example embodiment, the components forming the data structuring device according to the second example embodiment, which have the same names, are denoted with the same reference symbols, and overlapping description for the common parts is omitted.

Figure 11:
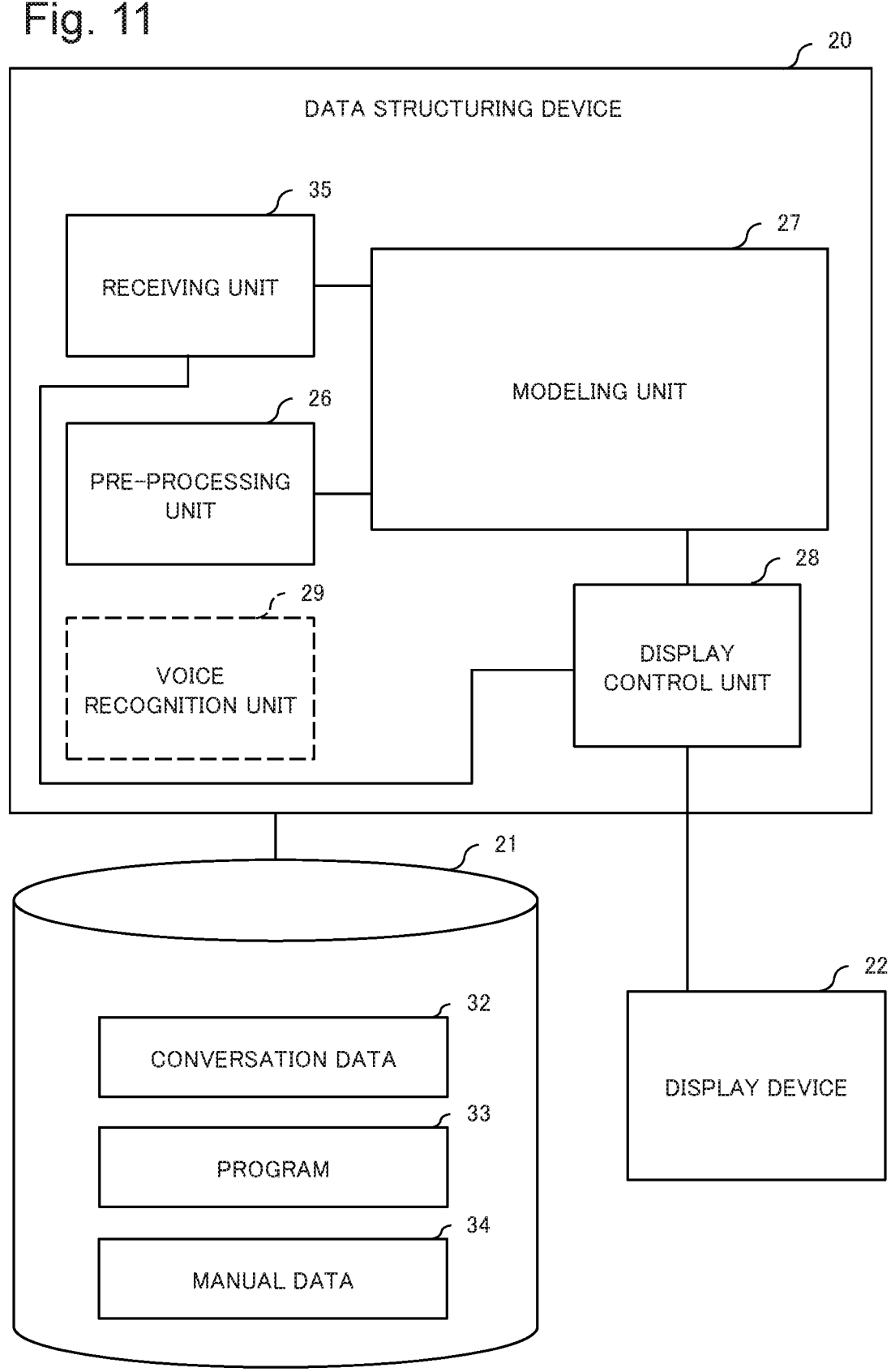
FIG. 11 is a block diagram illustrating in a simplified manner a configuration of a data structuring device according to a third example embodiment of the present invention.

FIG. 11 is a block diagram illustrating in a simplified manner a configuration of the data structuring device according to the third example embodiment. The data structuring device 20 according to the third example embodiment is assumed to model, for example, a conversation between an operator at an order receiving center that receives an order of a product and a user in a tree structure, and uses manual data 34 for the modeling processing in place of the branch expression data 31.

Specifically, in the third example embodiment, the manual data 34 is stored in the storage device 21 in addition to the conversation data 32 and the program 33. The manual data 34 are data indicating an utterance example (utterance manual) used when an operator has a conversation with a user, and has a mode in which item IDs are associated with the utterance example data illustrated in FIG. 12, for example.

Further, in the third example embodiment, the data structuring device 20 includes a receiving unit 35 being an acquisition unit in place of the expression receiving unit 25. The receiving unit 35 has a function of causing the display control unit 28 to display the utterance example data in the manual data 34 on the display device 22. Further, the receiving unit 35 has a function of causing the display control unit 28 to display a message, which is "please specify utterance example data to be used as a branch expression from the utterance example data displayed on the display device 22", on the display device 22. Further, the receiving unit 35 has a function of receiving specified information, when an operator of the data structuring device 20 recognizes the display, and specifies one piece or a plurality of pieces of utterance example data (or item IDs) to be used as a branch expression from the utterance example data displayed on display device 22. Further, the receiving unit 35 has a function of acquiring the utterance example data associated with the specified information from the manual data 34, and outputting the acquired data to the modeling unit 27 as the branch expression data.

The modeling unit 27 has a similar function as the function described in the second example embodiment, except for acquiring the branch expression data from the utterance example data, and has a function of modeling the plurality of pieces of conversation data 32 into one tree structure. Note that, when the modeling unit 27 specifies the branch expression node in the conversation data 32, ambiguous searching is used, for example. Further, the processing flow of the modeling unit 27 is similar to the processing flow of the modeling unit 27, which is described in the second example embodiment, and hence description therefor is omitted.

Figure 13:
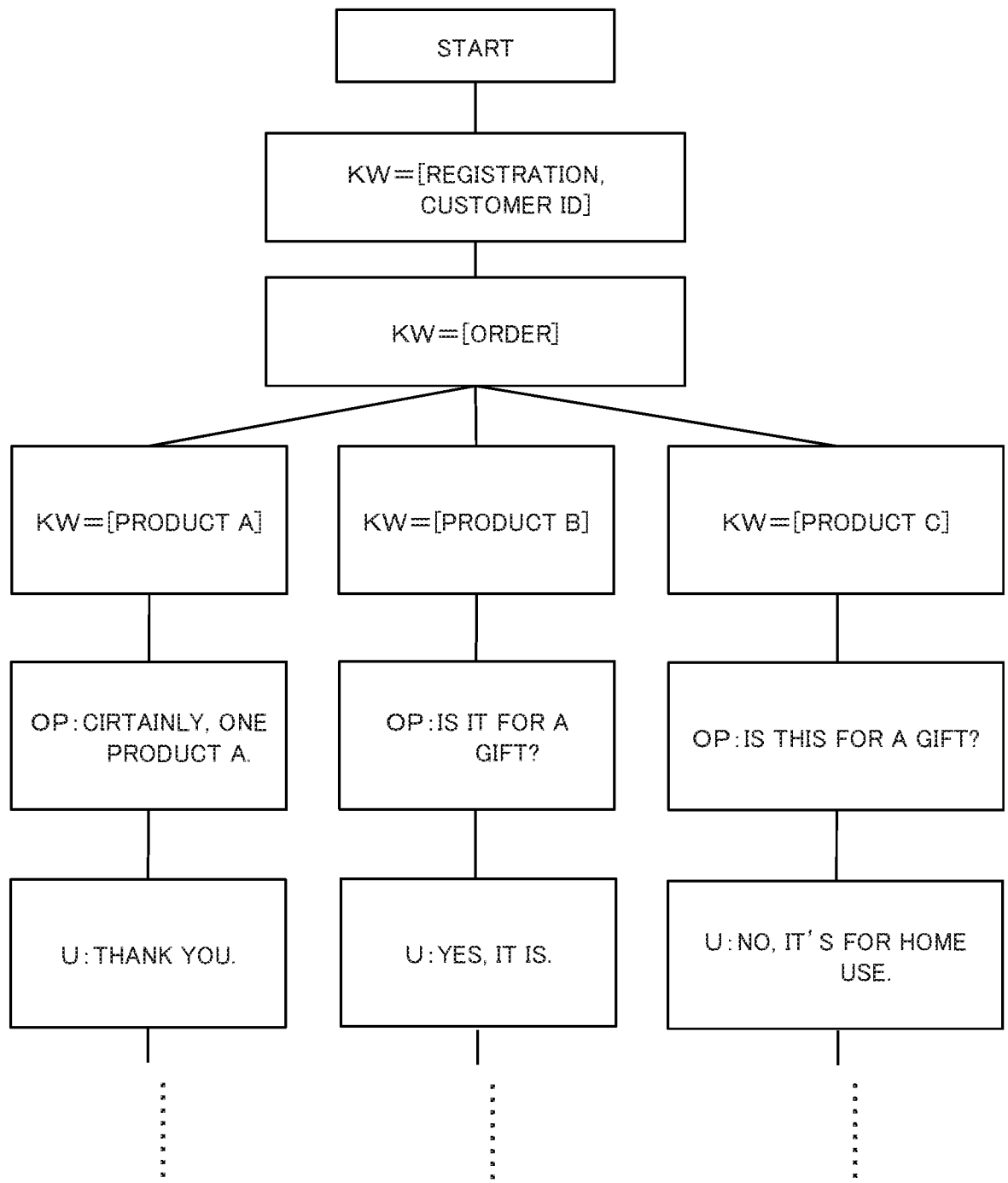
FIG. 13 is a diagram illustrating a specific model example in which the data structuring device according to the third example embodiment integrates a plurality of pieces of conversation data into one tree structure.

In FIG. 13, a specific example of a tree structure of the conversation data 32, which is modeled by the modeling unit 27, is given. The tree structure in the specific example is acquired by modeling the three pieces of conversation data 32 in FIG. 4 to FIG. 6, when the utterance data "What would you like to order?" with an item ID "2-1" in the manual data illustrated in FIG. 12 are specified as the branch expression data. Note that, both of the tree structures illustrated in FIG. 13 and FIG. 9 are models acquired by integrating, into one tree structure, the conversation data in FIG. 4 to FIG. 6, and have differences as illustrated in FIG. 13 and FIG. 9 because different branch expressions are used for modeling. Specifically, in FIG. 9, the tree structure modeled based on two branch expressions of "(What would you like to)? order.* (?|please.)$" and "Is (it|this) for a (present|gift)?$" is illustrated. In FIG. 13, the tree structure modeled based on one branch expression of "What would you like to order?" is illustrated. Further, in FIG. 13, similarly in FIG. 9, KW refers to a key word, OP refers to an operator, and U refers to a user.

In the specific example in FIG. 13, the branch expression is one branch expression including "order", and hence the utterance from the root to the branch expression node including the branch expression is integrated in one node. Further, the reply utterances for the branch expression (inquiry) are integrated in three nodes being "KW (key word)=product A", "KW (key word)=product B", and "KW (key word)=product C".

Similarly in the second example embodiment, the data structuring device 20 according to the third example embodiment has a configuration in which the plurality of pieces of conversation data 32 are integrated and modeled into one tree structure by focusing on a branch expression, and hence effects similar to those in the second example embodiment can be acquired. Further, the data structuring device 20 according to the third example embodiment uses the utterance manual data as the branch expression data, and hence work for preparing data dedicated for the branch expression in advance can be omitted.

Fourth Example Embodiment

A fourth example embodiment of the present invention is described below. Note that, in the description of the fourth example embodiment, the components forming the data structuring device according to each of the second and third example embodiments, which have the same names, are denoted with the same reference symbols, and overlapping description for the common parts is omitted.

Figure 14:
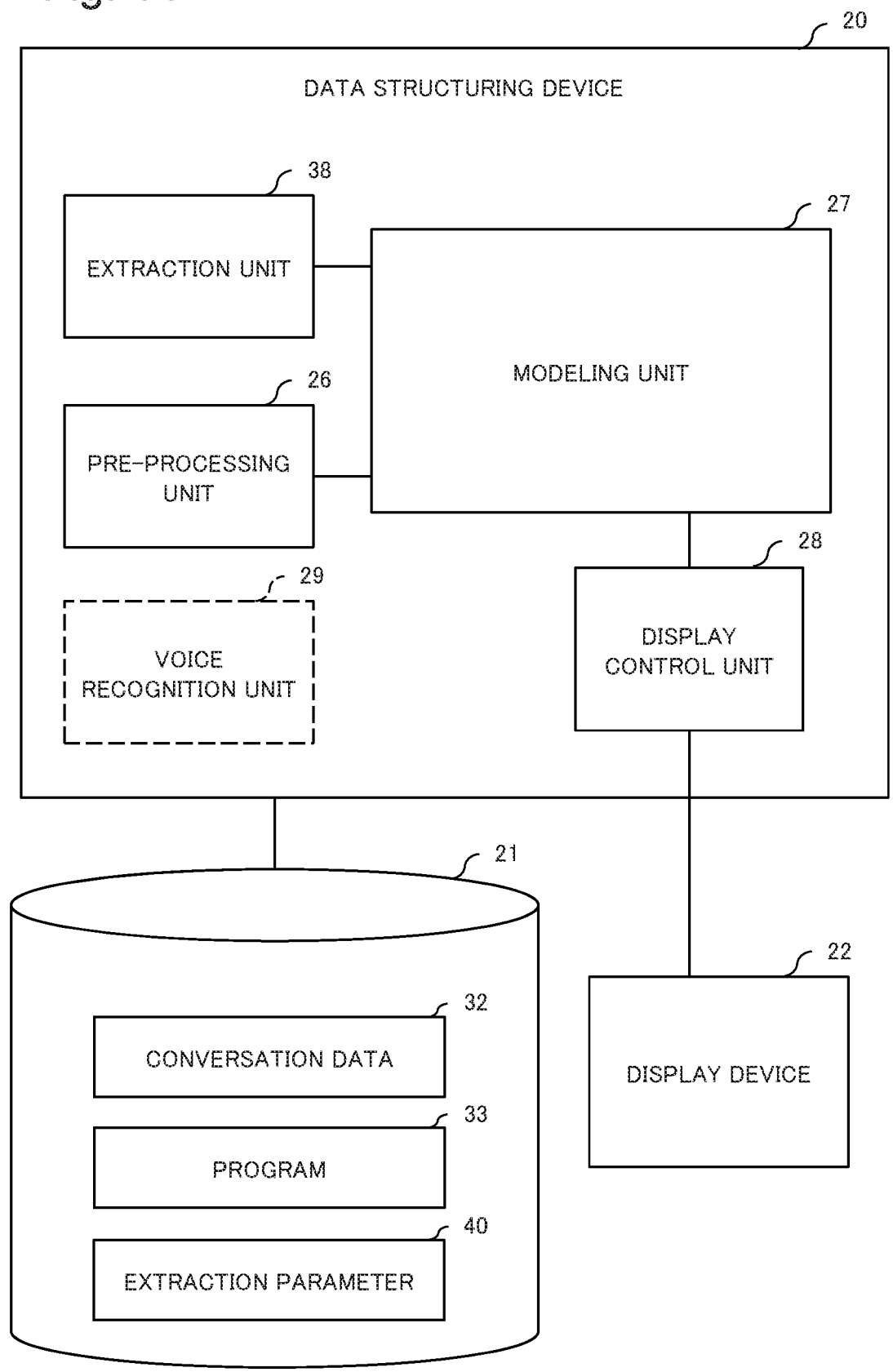
FIG. 14 is a block diagram illustrating in a simplified manner a configuration of a data structuring device according to a fourth example embodiment of the present invention.

FIG. 14 is a block diagram illustrating in a simplified manner a configuration of a data structuring device according to the fourth example embodiment. The data structuring device 20 according to the fourth example embodiment includes an extraction unit 38 being an acquisition unit in place of the expression receiving unit 25 and the receiving unit 35. Further, an extraction parameter 40 is stored in the storage device 21. The extraction parameter 40 refers to data indicating an extraction condition used for processing of extracting a branch expression candidate from the conversation data 32. In the fourth example embodiment, the extraction parameter 40 indicates an appearance frequency (for example, a value of two or greater) expressing the extraction condition.

The extraction unit 38 has a function of extracting, as a branch expression candidate, an utterance (for example, an entire utterance, a clause, a word, or the like), which satisfies the extraction condition, from the conversation data 32 being a processing target, based on the extraction parameter 40. For example, when the conversation data being a processing target is three pieces of conversation data illustrated in FIG. 4, FIG. 5, and FIG. 15 and the extraction parameter 40 satisfies "≥2 (equal to or greater than 2)", for example, the extraction unit 38 extracts the utterance data as illustrated in FIG. 16, as a branch expression candidate. In the example in FIG. 16, the extracted utterance data (hereinafter, also referred to as extraction data) is associated with an item ID for identifying the extraction data and information on a frequency (appearance frequency) at which the extraction data appears in the plurality of pieces of conversation data 32 being a processing target. The extraction data as illustrated in FIG. 16 is stored in, for example, the storage device 21.

Further, the extraction unit 38 has a function of causing the display control unit 28 to display the extraction data on the display device 22. Further, the extraction unit 38 has a function of causing the display control unit 28 to display a message, which is "please specify an utterance to be used as a branch expression from the displayed extraction data", on the display device 22. Furthermore, the extraction unit 38 has a function of receiving information indicating the specified extraction data, when an operator of the data structuring device 20 specifies one piece or a plurality of pieces of extraction data (or item IDs) as a branch expression from the extraction data displayed on the display device 22. Further, the extraction unit 38 has a function of outputting the specified extraction data to the modeling unit 27 as the branch expression data.

The modeling unit 27 has a similar function as the function described in the second or third example embodiment, except for receiving the branch expression data from the extraction unit 38, and has a function of modeling the plurality of pieces of conversation data 32 into one tree structure by the similar processing of the modeling unit 27 in the second or third example embodiment. Note that, when the modeling unit 27 specifies the branch expression node in the conversation data 32, ambiguous searching is used, for example. Further, the processing flow of the modeling unit 27 is similar to the processing flow of the modeling unit 27, which is described in the second example embodiment, and hence description therefor is omitted.

Figure 17:
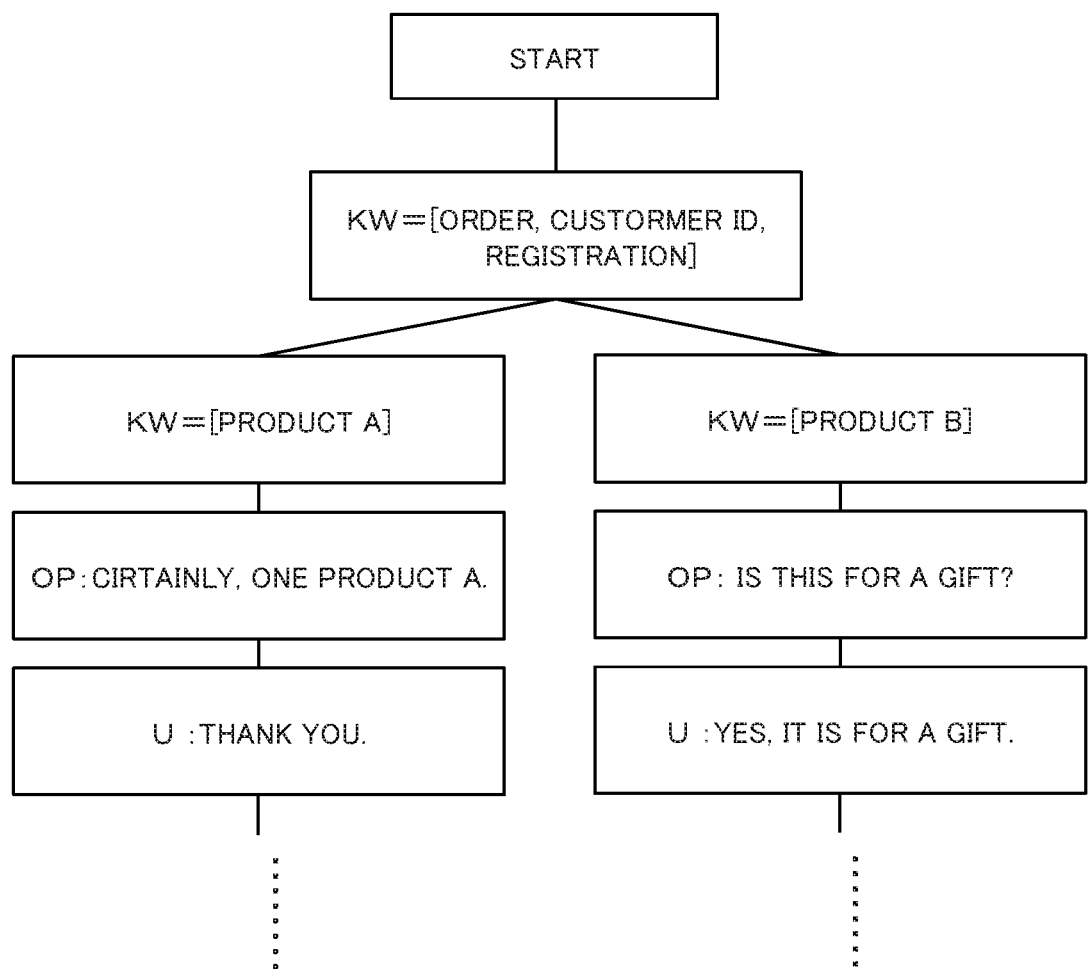
FIG. 17 is a diagram illustrating a specific model example in which a plurality of pieces of conversation data are integrated into one tree structure in the fourth example embodiment.

In FIG. 17, a specific example of a tree structure of the conversation data modeled by the modeling unit 27 is given. In this specific example, the conversation data 32 being a processing target are the three pieces of data illustrated in FIG. 4, FIG. 5, and FIG. 15. Further, among those three pieces of conversation data 32 being a processing target, it is assumed that the extraction unit 38 extracts the utterance data as illustrated in FIG. 16, as extraction data, based on the condition that "the appearance frequency is two or greater" being the extraction condition specified with the extraction parameter 40. Further, from the extraction data, it is assumed that an operator of the data structuring device 20 selects "One product A" as a branch expression. In this case, the modeling unit 27 uses the selected branch expression and models the three pieces of conversation data 32 in FIG. 4, FIG. 5, and FIG. 15 into one tree structure as illustrated in FIG. 17.

In the specific example in FIG. 17, the branch expression is one branch expression which is "One product A", and hence the conversation to the branch expression is integrated in one node. Further, the reply conversations for the branch expression are integrated in two nodes being "KW (key word)=product A" and "KW (key word)=product B".

Similarly in the second and third example embodiments, the data structuring device 20 according to the fourth example embodiment has a configuration in which the plurality of pieces of conversation data are integrated and modeled in a tree structure by focusing on the branch expression, and hence effects similar to those in the second and third example embodiments can be acquired. Further, in the data structuring device 20 according to the fourth example embodiment, the extraction unit 38 can omit to work for preparing data dedicated for the branch expression in advance because the extraction unit 38 extracts a branch expression candidate from the conversation data being a processing target and.

Other Example Embodiments

Note that, the present invention is not limited to the first to fourth example embodiments, and may adopt various modes. For example, in the second to fourth example embodiments, one utterance is one node when the conversation data is modeled in a graph structure, but the unit for the node is not limited to one utterance. For example, an utterance from a speaker change (turn) to a next speaker change (turn) may be one node. Further, one topic may be one node, and one phase may be one node.

Further, in the second to fourth example embodiments, description is made on the function of the data structuring device 20 with a conversation between an operator at an order receiving center and a user as a specific example, but the conversation modeled by the data structuring device 20 is not limited to such conversation. The data structuring device 20 is capable of modeling by integrating a plurality of pieces of conversation data in other similar situations into one tree structure.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2017-054520, filed on Mar. 21, 2017, the disclosure of which is incorporated herein in its entirety by reference.

REFERENCE SIGNS LIST

1, 20 Data structuring device
2 Acquisition unit
3, 27 Modeling unit
25 Expression receiving unit
35 Receiving unit
38 Extraction unit

What is claimed is:

1. A data structuring device comprising:
at least one memory storing instructions; and
at least one hardware processor configured to access the at least one memory and, according to the instructions, implement:
an acquisition unit configured to acquire branch expression data expressing a branch expression being an utterance expression for which a plurality of replies different from one another are assumed in a conversation; and
a modeling unit configured to, in a plurality of pieces of conversation data being converted into a graph structure in which conversation contents are divided into a plurality of nodes and the plurality of nodes are connected by edges, model the plurality of pieces of conversation data into one tree structure by performing processing of integrating the nodes, which share the branch expression in common, into one node, based on the acquired branch expression data, wherein
the modelling unit is further configured to:
integrate nodes from a start of a conversation in the plurality of pieces of conversation data to a branch expression node including the branch expression, along a conversation flow,
when nodes sharing another of the branch expression in common are present on a conversation end side farther than the branch expression node in the plurality of pieces of conversation data, integrate the nodes into one node, and
when a node including the branch expression is not present on a conversation end side farther than the branch expression node in each piece of the conversation data, integrate nodes on a conversation end side farther than the branch expression node.

2. The data structuring device according to claim 1, wherein the modeling unit provides a child node connected to the branch expression node with a key word associated with a reply content for the branch expression.

3. The data structuring device according to claim 1, wherein the acquisition unit acquires the branch expression data from manual data indicating a conversation utterance example, based on information for specifying an utterance example to be used as the branch expression data from the manual data.

4. The data structuring device according to claim 1, wherein the acquisition unit acquires, based on information for specifying a branch expression candidate to be used as the branch expression data among branch expression candidates acquired by analyzing the plurality of pieces of conversation data, the branch expression data from the branch expression candidate.

5. The data structuring device according to claim 1, wherein the modeling unit further includes a function of providing a node acquired by integrating a plurality of nodes with a key word expressing a conversation content included in the node.

6. A data structuring method comprising:
acquiring branch expression data expressing a branch expression being an utterance expression for which a plurality of replies different from one another are assumed in a conversation;
modeling, in a plurality of pieces of conversation data being converted into a graph structure in which conversation contents are divided into a plurality of nodes and the plurality of nodes are connected by edges, the plurality of pieces of conversation data into one tree structure by performing processing of integrating the nodes, which share the branch expression in common, into one node, based on the acquired branch expression data;
integrating nodes from a start of a conversation in the plurality of pieces of conversation data to a branch expression node including the branch expression, along a conversation flow;

when nodes sharing another of the branch expression in common are present on a conversation end side farther than the branch expression node in the plurality of pieces of conversation data, integrating the nodes into one node; and when a node including the branch expression is not present on a conversation end side farther than the branch expression node in each piece of the conversation data, integrating nodes on a conversation end side farther than the branch expression node.

7. A non-transitory computer-readable program storage medium storing a computer program causing a computer to execute:

processing of acquiring branch expression data expressing a branch expression being an utterance expression for which a plurality of replies different from one another are assumed in a conversation;

processing of modeling, in a plurality of pieces of conversation data being converted into a graph structure in which conversation contents are divided into a plurality of nodes and the plurality of nodes are connected by edges, the plurality of pieces of conversation data into one tree structure by performing processing of integrating the nodes, which share the branch expression in common, into one node, based on the acquired branch expression data;

processing of integrating nodes from a start of a conversation in the plurality of pieces of conversation data to a branch expression node including the branch expression, along a conversation flow, processing of, when nodes sharing another of the branch expression in common are present on a conversation end side farther than the branch expression node in the plurality of pieces of conversation data, integrating the nodes into one node, and processing of, when a node including the branch expression is not present on a conversation end side farther than the branch expression node in each piece of the conversation data, integrating nodes on a conversation end side farther than the branch expression node.

8. The data structuring method according to claim 6, further comprising:

providing a child node connected to the branch expression node with a key word associated with a reply content for the branch expression.

9. The data structuring method according to claim 6, further comprising:

acquiring the branch expression data from manual data indicating a conversation utterance example, based on information for specifying an utterance example to be used as the branch expression data from the manual data.

10. The data structuring method according to claim 6, further comprising:

acquiring, based on information for specifying a branch expression candidate to be used as the branch expression data among branch expression candidates acquired by analyzing the plurality of pieces of conversation data, the branch expression data from the branch expression candidate.

11. The data structuring method according to claim 6, further comprising:

providing a node acquired by integrating a plurality of nodes with a key word expressing a conversation content included in the node.

* * * * *